US012754391B2

(12) United States Patent
Tanaka

(10) Patent No.: US 12,754,391 B2
(45) Date of Patent: Oct. 6, 2026

(54) OPTICAL APPARATUS AND IMAGING APPARATUS

(71) Applicant: CANON KABUSHIKI KAISHA, Tokyo (JP)

(72) Inventor: Hyochoru Tanaka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 18/425,305

(22) Filed: Jan. 29, 2024

(65) Prior Publication Data

US 2024/0264406 A1 Aug. 8, 2024

(30) Foreign Application Priority Data

Feb. 2, 2023 (JP) ................................ 2023-014353

(51) Int. Cl.

| | |
|---|---|
| ***G02B 7/10*** | (2021.01) |
| ***G02B 7/04*** | (2021.01) |
| ***G03B 17/14*** | (2021.01) |

(52) U.S. Cl.

CPC ................ *G02B 7/10* (2013.01); *G02B 7/04* (2013.01); *G03B 17/14* (2013.01)

(58) Field of Classification Search

CPC ................................... G02B 7/04; G02B 7/10

USPC ......................................... 359/694, 699–701

See application file for complete search history.

(56) References Cited

U.S. PATENT DOCUMENTS

| | | | | | |
|---|---|---|---|---|---|
| 4,322,151 | A * | 3/1982 | Weiss | G02B 7/04 | 396/89 |
| 4,380,378 | A * | 4/1983 | Tamura | G02B 7/10 | 359/699 |
| 5,586,467 | A * | 12/1996 | Weber | F16H 25/186 | 74/567 |
| 5,818,648 | A * | 10/1998 | Coath | G02B 7/04 | 359/823 |
| 5,907,439 | A | 5/1999 | Matsui | | |
| 6,072,639 | A * | 6/2000 | Onda | G02B 7/102 | 359/702 |

(Continued)

FOREIGN PATENT DOCUMENTS

| | | | | |
|---|---|---|---|---|
| JP | H01133014 A * | 5/1989 | | G02B 7/04 |
| JP | H10142471 A | 5/1998 | | |

(Continued)

*Primary Examiner* — Zachary W Wilkes

(74) *Attorney, Agent, or Firm* — ROSSI, KIMMS & McDOWELL LLP

(57) ABSTRACT

An optical apparatus comprises a first holding member configured to hold a first engaging member, a second holding member configured to hold a second engaging member, a biasing member configured to bias the first engaging member and the second engaging member in a direction in which the first engaging member and the second engaging member are separated from each other by one of the biasing members abutting on a first abutting portion provided on the first holding member and the other of the biasing members abutting on a second abutting portion provided on the second holding member and an optical element. The first engaging member is disposed closer to an object side than the second engaging member in an optical axis direction of the optical element, and the second abutting portion is disposed closer to the object side than the first abutting portion in the optical axis direction.

13 Claims, 8 Drawing Sheets

(56) References Cited

U.S. PATENT DOCUMENTS

| | | | | | |
|---|---|---|---|---|---|
| 6,094,534 | A * | 7/2000 | Omiya | G02B 7/10 | 359/700 |
| 6,104,551 | A * | 8/2000 | Matsui | G02B 7/10 | 359/689 |
| 6,909,558 | B2 * | 6/2005 | Orimo | G02B 13/009 | 359/813 |
| 10,241,291 | B2 * | 3/2019 | Kamo | G02B 7/023 | |
| 11,300,753 | B2 * | 4/2022 | Sato | G02B 7/04 | |
| 11,586,003 | B2 * | 2/2023 | Konishi | G02B 7/021 | |
| 11,624,892 | B2 * | 4/2023 | Noda | G02B 7/04 | 359/699 |
| 12,066,687 | B2 * | 8/2024 | Nagaoka | G03B 13/36 | |
| 12,313,901 | B2 * | 5/2025 | Iwasaki | G02B 7/04 | |
| 2017/0276896 | A1 * | 9/2017 | Kamo | G02B 7/021 | |
| 2020/0049929 | A1 * | 2/2020 | Sato | G02B 7/026 | |
| 2020/0400914 | A1 * | 12/2020 | Noda | G03B 5/02 | |
| 2021/0223502 | A1 * | 7/2021 | Konishi | G02B 7/04 | |
| 2022/0075140 | A1 * | 3/2022 | Nagaoka | G02B 7/04 | |
| 2022/0121000 | A1 * | 4/2022 | Iwasaki | G02B 7/08 | |
| 2022/0128788 | A1 * | 4/2022 | Yamada | G02B 7/04 | |

FOREIGN PATENT DOCUMENTS

| | | | | |
|---|---|---|---|---|
| JP | 2000304996 | A | 11/2000 | |
| JP | 2008020488 | A * | 1/2008 | |
| JP | 2010066633 | A * | 3/2010 | G02B 7/04 |
| JP | 2013257369 | A * | 12/2013 | |
| JP | 2017027086 | A | 2/2017 | |
| JP | 2020177176 | A * | 10/2020 | G02B 7/04 |
| WO | 2020137563 | A1 | 7/2020 | |
| WO | WO-2020170583 | A1 * | 8/2020 | G02B 7/04 |
| WO | WO-2020170584 | A1 * | 8/2020 | G03B 17/12 |

* cited by examiner

OPTICAL APPARATUS AND IMAGING APPARATUS

BACKGROUND OF THE INVENTION

Field of the Invention

The present disclosure relates to an optical apparatus and an imaging apparatus.

Description of the Related Art

There is a technique in which a cam follower (bearing) is used in an optical apparatus to reduce operation torque so that zooming or focusing can be performed smoothly. In such a configuration using the cam follower, a mechanism for suppressing backlash between the straight groove and the cam groove which are engaged with the cam follower is employed.

SUMMARY OF THE INVENTION

Japanese Patent Application Laid-Open No. 2017-27086 discloses an optical apparatus including a first cam follower connected to a second group lens barrel, a second cam follower connected to a moving ring, and a coil spring provided so that the first cam follower and the second cam follower are biased in a direction intersecting an optical axis direction.

In the optical apparatus disclosed in Japanese Patent Application Laid-Open No. 2017-27086, the zoom cam ring and the fixed barrel are provided with cam grooves that engage with the paired first, second cam followers, respectively. The formation of the two cam grooves requires the cam barrel to have a large wall thickness, which may lead to an increase in size and length of the product.

An object of the present disclosure is to provide an optical apparatus which is advantageous in terms of miniaturization of a product.

According to an embodiment of the present disclosure, an optical apparatus comprising: a first holding member configured to hold a first engaging member; a second holding member configured to hold a second engaging member; a guide barrel having a straight guide portion with which the first engaging member and the second engaging member are engaged; a cam barrel having a cam groove with which the first engaging member and the second engaging member are engaged; a biasing member configured to bias the first engaging member and the second engaging member in a direction in which the first engaging member and the second engaging member are separated from each other by one of the biasing members abutting on a first abutting portion provided on the first holding member and the other of the biasing members abutting on a second abutting portion provided on the second holding member; and an optical element, wherein the first engaging member is disposed closer to an object side than the second engaging member in an optical axis direction of the optical element; and wherein the second abutting portion is disposed closer to the object side than the first abutting portion in the optical axis direction.

Further features of the present invention will become apparent from the following description of exemplary embodiments with reference to the attached drawings.

DESCRIPTION OF THE EMBODIMENTS

Figure 1:
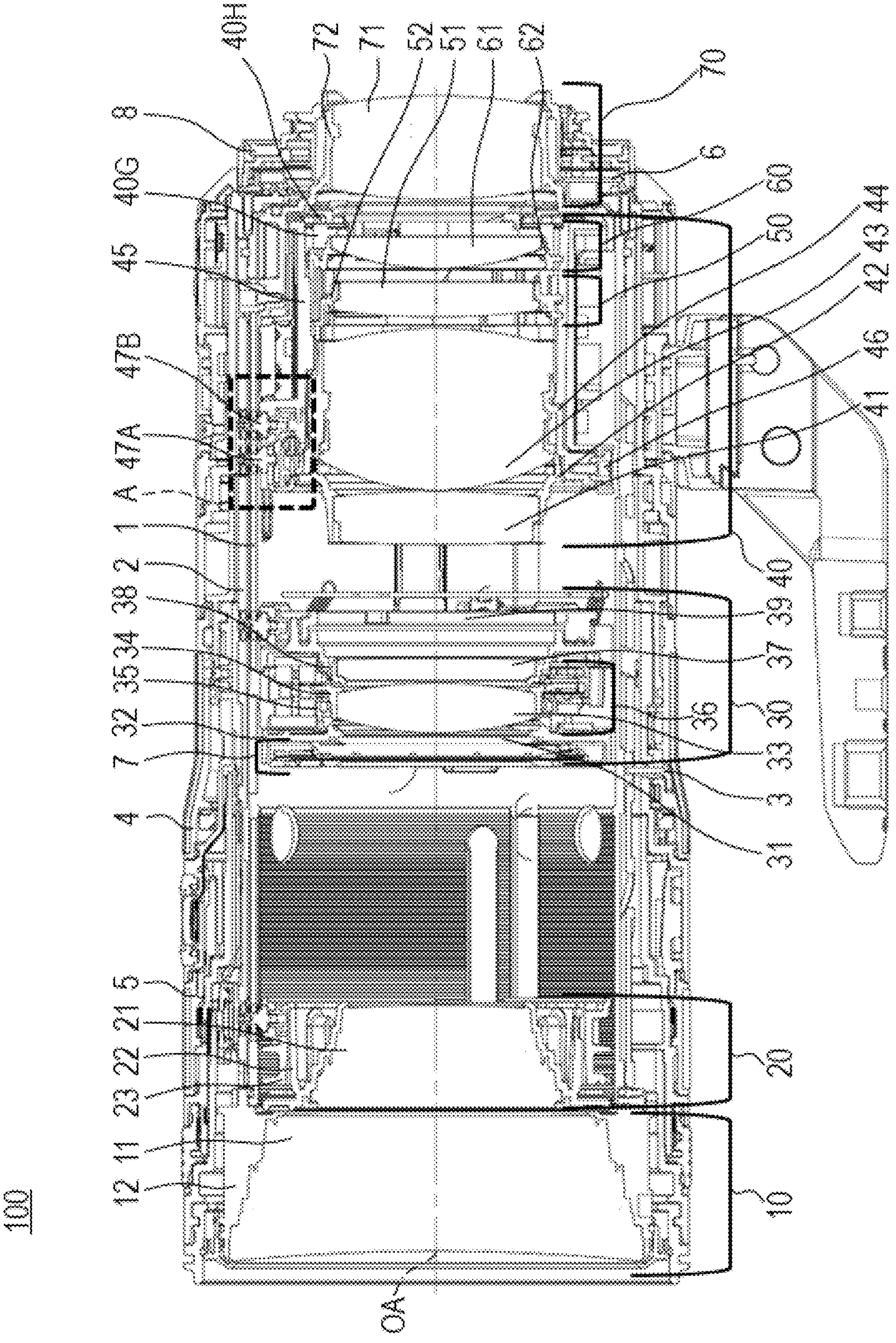
FIG. 1 is a cross-sectional view taken along a cross section parallel to an optical axis (OA) at a wide-angle end of a lens apparatus (100).
Figure 2:
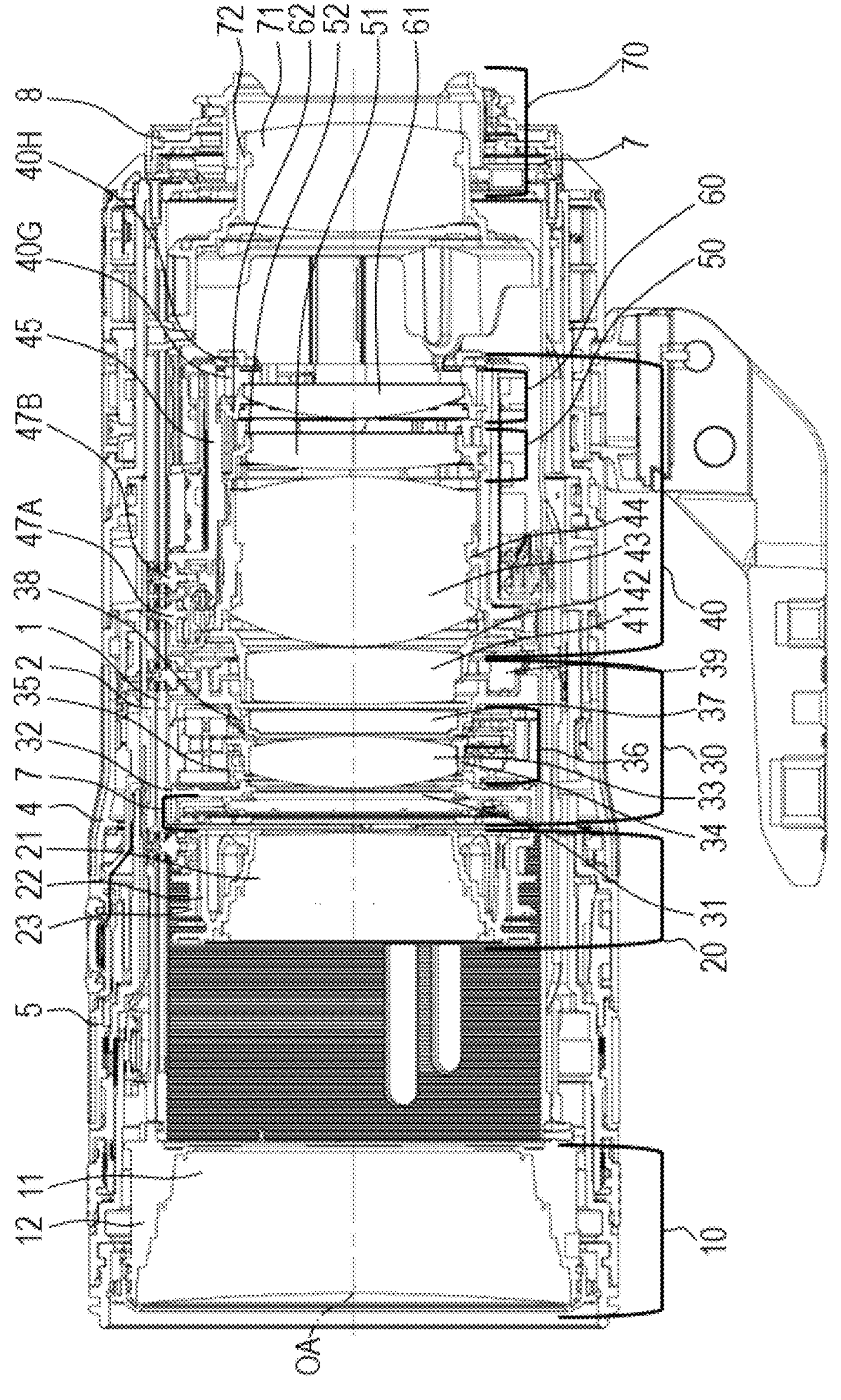
FIG. 2 is a cross-sectional view taken along a cross section parallel to the optical axis (OA) at the telephoto end of the lens apparatus (100).

Preferred embodiments of the present invention will now be described in detail in accordance with the accompanying drawings. First, an overall configuration of a lens apparatus 100 (optical apparatus) which is a lens barrel according to an embodiment of the present disclosure will be described with reference to FIGS. 1 and 2. FIG. 1 is a cross-sectional view taken along a cross section parallel to an optical axis OA at a wide-angle end (wide end) of the lens apparatus 100 according to the embodiment. FIG. 2 is a cross-sectional view taken along a cross section parallel to the optical axis OA at the telephoto end of the lens apparatus 100.

The lens apparatus 100 according to the embodiment is a zoom lens capable of changing a focal length from a wide-angle end (wide end) to a telephoto end (tele end). In addition, the lens unit constituting the lens apparatus 100 has a seven units configuration including first to seventh lens units. These lens groups are arranged in the order of the first unit 10, the second unit 20, the third unit 30, the fourth unit 40, the fifth unit 50, the sixth unit 60, and the seventh unit 70 from the object side.

Next, each lens unit will be described. The first unit 10 includes a first lens holding frame 12 that holds first lens 11. The first lens holding frame 12 has a bayonet portion and a press-fit projection (not shown), and is bayonet-coupled to the guide barrel 1. The rotation of the first lens holding frame 12 is regulated by engaging the first lens holding frame 12 with the guide barrel 1 by a shaft screw (not shown).

The second unit 20 includes a second lens holding frame 22 that holds the second lens 21. A second base 23 holds the second lens holding frame 22 via an eccentric roller (not shown) so as to be optically adjustable.

The third unit 30 is divided into three lens groups of a 3A lens holding frame 32, a 3B unit 36, and a 3C lens holding frame 38. The 3A lens holding frame 32 holds the 3A lens 31. The 3B unit 36 is a so-called camera shake correction unit, and includes a 3B lens holding frame 34 that holds the 3B lens 33. The 3B lens holding frame 34 is a camera shake correction optical system that is held so as to be movable in a direction orthogonal to the optical axis with respect to a 3B base 35. The 3B base 35 holds the 3A lens holding frame 32 via an eccentric roller (not shown) in an optically adjustable manner. The 3C lens holding frame 38 holds a 3C lens 37 and is fastened to the 3B base 35 with screws. Further, the 3C lens holding frame 38 is held on a third unit base 39 via an eccentric roller (not shown) in an optically adjustable state.

The fourth unit 40 has a 4A lens holding frame 42 (lens barrel) that holds a 4A lens 41 (glass, optical apparatus).

Further, a 4B lens holding frame 44 for holding the 4B lens 43 is provided. The 4A lens holding frame 42 and the 4B lens holding frame 44 are fastened to each other with screws, and the 4B lens holding frame 44 is held by a rear base 45 (second holding member) via three fourth eccentric rollers 46 (roller members) so as to be optically adjustable (eccentricity adjustment). That is, the 4A lens holding frame 42 and the 4B lens holding frame 44 are optical adjustment groups whose eccentricity is adjusted by the fourth eccentric roller 46. The rear base 45 movably holds the fifth unit 50 and the sixth unit 60 in the optical axis direction via the guide bar 40G. One end of each of the four guide bars 40G is held by the rear base 45, and the other end is held by a guide bar holding parts 40H. Four guide bar holding parts 40H are fastened to the rear base 45 with screws.

The fifth unit 50 constitutes a fifth lens holding frame 52 which is a focus group and which holds a fifth lens 51 is provided, and the fifth lens holding frame 52 is linearly guided in the optical axis direction by two guide bars 40G. The fifth lens holding frame 52 is driven in the optical axis direction with respect to the rear base 45 by a motor unit of a driving unit, for example, a piezoelectric actuator, a stepping motor (STM), a voice coil motor (VCM) or the like. Further, an optical sensor corresponding to the scale is provided on the rear base 45 via a flexible printed wiring board (FPC). The scale and the optical sensor together constitute focus position detection means.

The sixth unit 60 is a floating group and has a sixth lens holding frame 62 that holds a sixth lens 61. The holding configuration and driving method of the sixth lens holding frame 62, the position detecting means, and the like are the same as those of the above-described focus group, and thus the description thereof will be omitted.

The seventh unit 70 has a seventh lens holding frame 72 for holding a seventh lens 71. The seventh lens holding frame 72 is engaged with a straight groove (not shown) and a cam groove (not shown) by a coaxial roller which is a cam follower, and is advanced and retracted in the optical axis direction by a zoom operation. The coaxial rollers are slightly press-fitted into the straight grooves and the cam grooves to eliminate backlash.

The zoom lens groups (the second unit 20 to the sixth unit 60) other than the seventh unit 70 are engaged with the straight grooves and the cam grooves by the bearing units which are cam followers, and are advanced and retracted in the optical axis direction by the zoom operation. Further, in order to maintain the optical performance, a biasing mechanism for biasing the bearing unit to the cam groove and the straight groove is mounted. A detailed configuration of the urging mechanism of the bearing unit will be described later.

Next, the zoom mechanism will be described. Among the above-described lens groups, the positions of the lens groups other than the first unit 10 are variable in the optical axis direction along a predetermined cam locus. A straight groove 1A (straight guide portion, see FIG. 5) that guides the lens group in the optical axis direction is formed in the guide barrel 1. Further, a bayonet claw (not shown) provided on the guide barrel 1 and a bayonet groove (not shown) provided on the cam barrel 2 (see FIG. 5) are engaged with each other, so that the guide barrel 1 holds the cam barrel 2 rotatably about the optical axis. The cam barrel 2 is provided with four types of cam grooves 2A corresponding to loci at the time of zooming operation, and these cam grooves 2A are engaged with the second unit 20, the third unit 30, the fourth unit 40, and the seventh unit 70 via cam followers (bearings or rollers), respectively. The fifth unit 50 and the sixth unit 60 are held by the fourth unit 40 so as to be movable in the optical axis direction. The second unit 20 to the seventh unit 70 that move during the zoom operation are referred to as a zoom lens group. Similarly, to the cam groove 2A, the zoom lens group is also engaged with the straight groove 1A provided in the guide barrel 1 via a cam follower.

The cam barrel 2 is connected to a zoom operation ring 4, which is held by a fixing member (not shown) so as to be rotatable about the optical axis, via a zoom key 3. Therefore, the cam barrel 2 is rotated by rotating the zoom operation ring 4, and the rotational force of the zoom operation ring 4 is converted into a straight motion by the cam groove 2A of the cam barrel 2 and the straight groove 1A of the guide barrel 1, so that the zoom lens group is moved in the optical axis direction to change the focal distance.

The zoom operation ring 4 serves as a groove into which a movable element of a resistance type sensor (potentiometer) serving as a position detection unit fixed to an intermediate fixed barrel (not shown) is fitted is provided, and an output of the resistance type linear sensor changes in accordance with a rotation amount of the zoom operation ring 4, so that zoom positional information can be detected, in the embodiment, a scale (not illustrated) for detecting the position in the optical axis direction is provided in the guide barrel 1, and an optical sensor corresponding to the scale is provided in the fourth unit 40, so that the zoom positional information can be detected in more detail. That is, the fifth unit 50 of the correction group, it is possible to calculate the amount of movement of the sixth unit 60 and the like, and correct defocus caused by zoom variation and aberration that occurs.

Next, a mechanism related to the focus operation will be described. The focus operation ring 5 is sandwiched between a front-side fixed barrel (not shown) and a fixing member, and is held rotatably about the optical axis. Further, the rotation amount and direction of the focus operation ring 5 are detected by a scale provided on an inner peripheral portion of the focus operation ring 5 and having black and white light and dark portions, and an optical sensor including a photodetector provided on an outer diameter side of the front fixed barrel.

Next, the main board serving as the control unit will be described. A main circuit substrate 6 (motor control unit) is in charge of focus drive control and control of the entire lens apparatus 100 such as the electromagnetic diaphragm unit 7 and the 3B unit 36, and is fastened to a rear-side fixed barrel (not shown) with screws. Further, the focus position control apparatus provided on the main circuit substrate 6 controls the fifth unit 50 and the sixth unit 60 so that the focus position changed by the zoom operation and each aberration amount are maintained to be equal to or less than a predetermined value.

Figure 8:
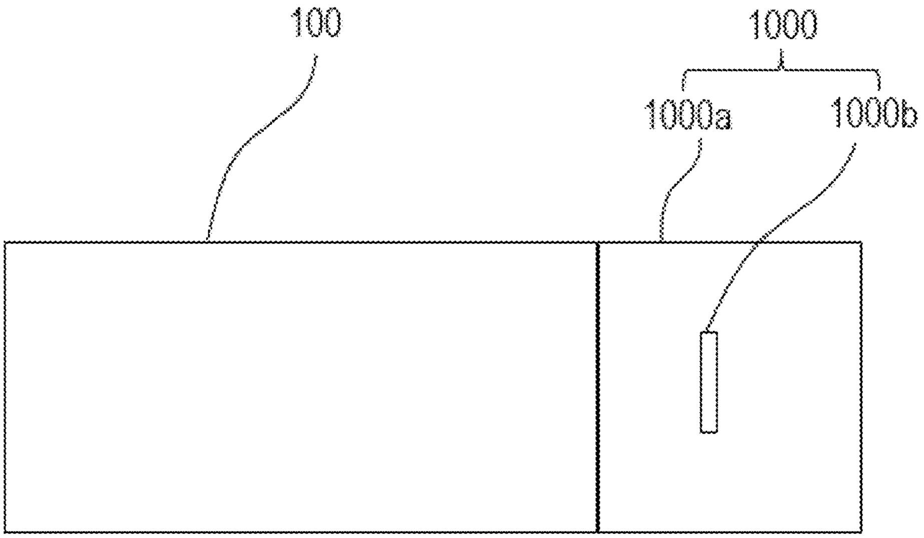
FIG. 8 is a schematic diagram illustrating a configuration example of an imaging apparatus using the lens apparatus (100).

Next, attachment and detachment of the lens apparatus 100 and the camera body will be described. FIG. 8 is a schematic diagram illustrating a configuration example of an imaging apparatus 1000 using the lens apparatus 100. The camera body is an imaging apparatus body 1000*a* including an image sensor 1000*b* such as a CCD or a CMOS. The image sensor 1000*b* photoelectrically converts (captures) a subject image as an optical image formed by the optical system of the lens apparatus 100 and outputs an imaging signal. The lens apparatus 100 is held by a user so as to be detachable from the camera body, and the lens apparatus 100 and the camera body constitute a camera system. The lens mount 8 has a bayonet portion for attachment to the camera body, the lens apparatus 100 is fixed to a rear-side fixed barrel (not illustrated) with a screw via a fixing member (not illustrated). Although a configuration in which the lens apparatus 100 is detachably mounted from the 1000*a* of the imaging apparatus body of the imaging apparatus 1000 has been described above, the present disclosure can also be applied to a lens-integrated imaging apparatus.

Figure 3:
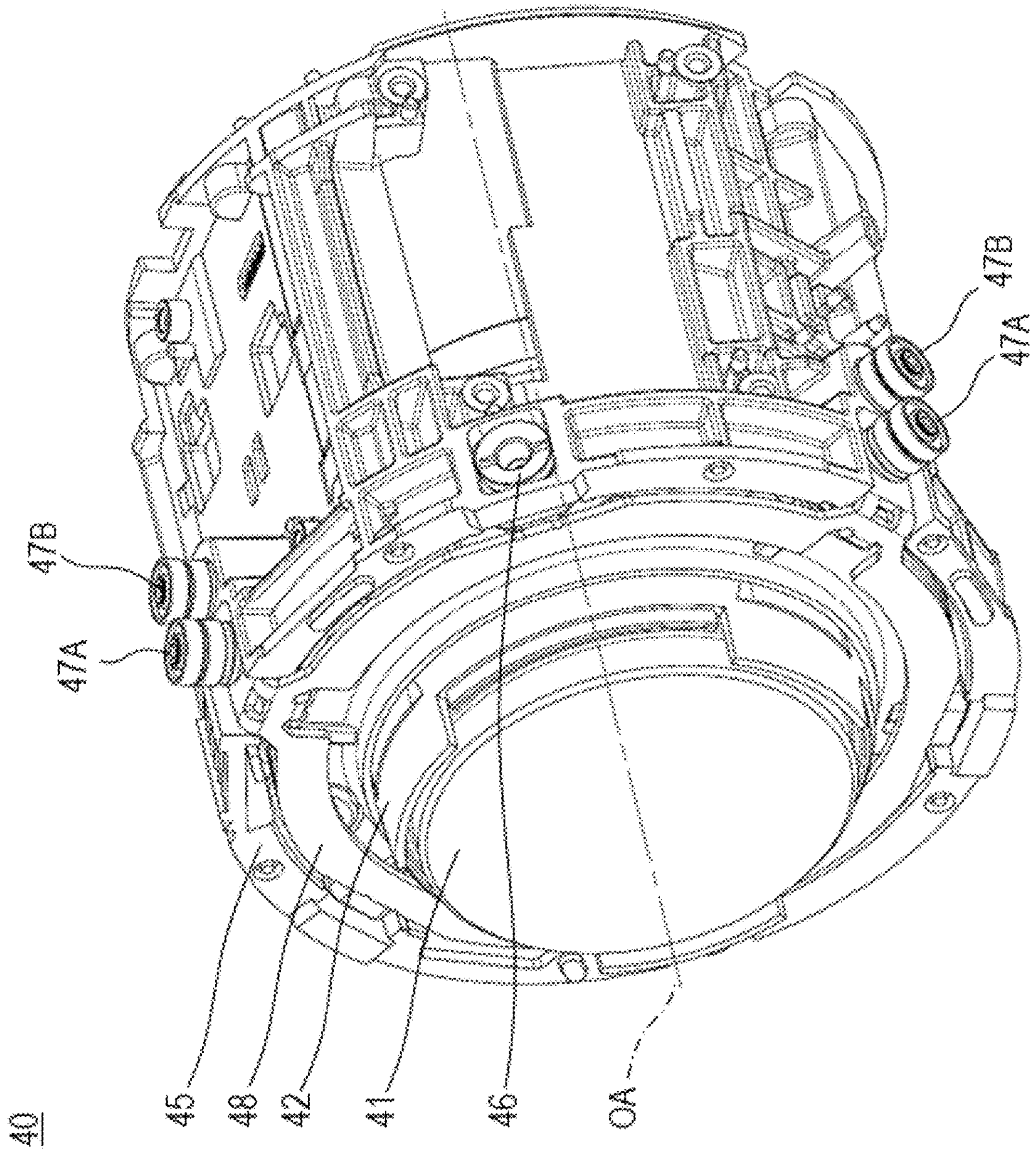
FIG. 3 is a perspective view illustrating a fourth unit (40).
Figure 4:
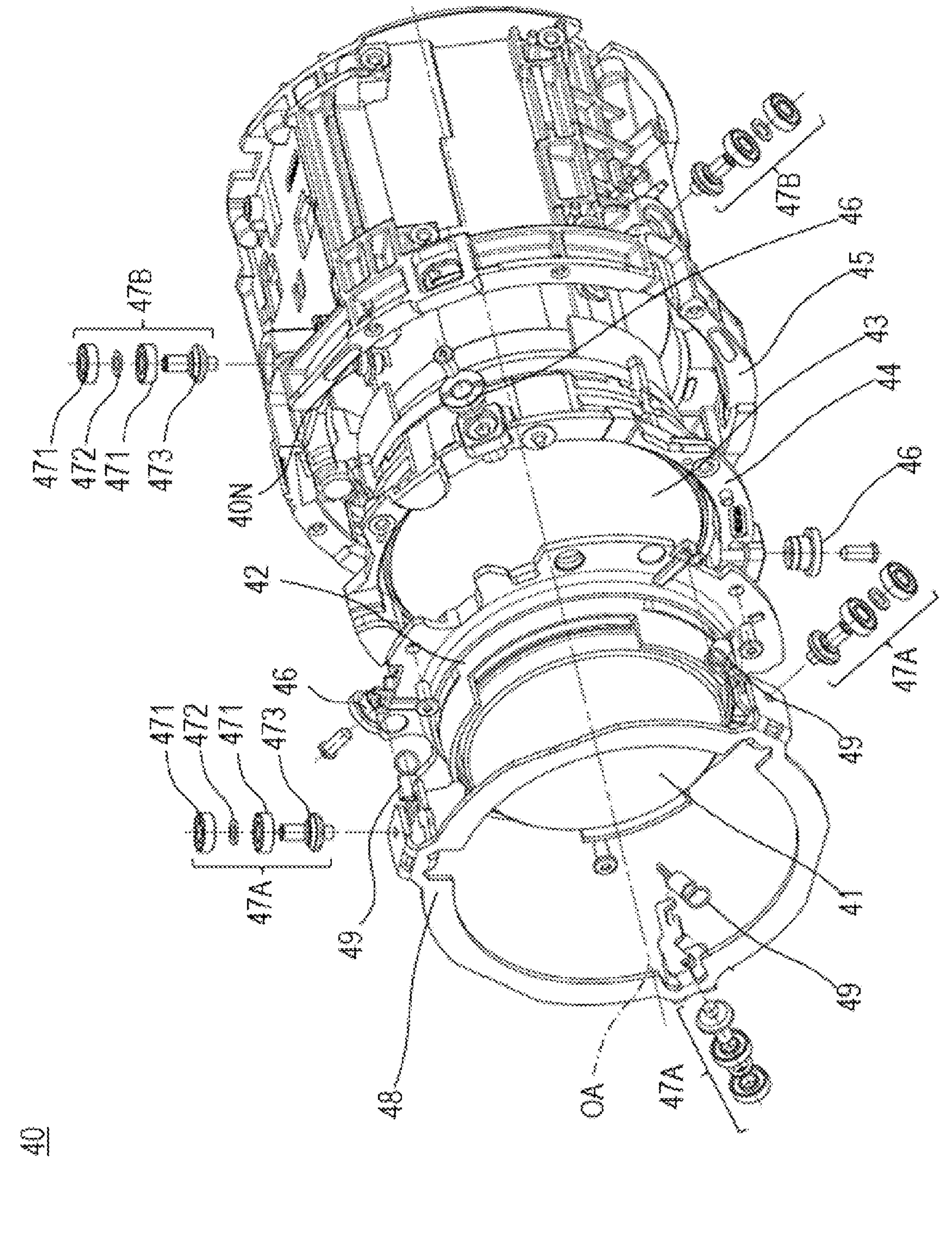
FIG. 4 is an exploded perspective view illustrating a configuration of the fourth unit (40).

Next, a holding configuration of a bearing unit 47A (first engaging member) and a bearing unit 47B (second engaging member) of the fourth unit 40 according to the present disclosure will be described with reference to FIGS. 3 and 4. FIG. 3 is a perspective view illustrating the fourth unit 40 according to the embodiment. FIG. 4 is an exploded perspective view illustrating the configuration of the fourth unit 40.

The fourth unit 40 is provided with the bearing unit 47A and the bearing unit 47B as cam followers for reduction of zoom torque and smooth zoom operability. These bearing units have a configuration in which a washer 472 portion is sandwiched between two bearings 471, and the two bearings 471 are press-fitted and fixed to the shaft 473.

The bearing unit 47A is screwed to a biasing metal plate 48 (first holding member). The bearing unit 47B is held by the rear base 45 with a bearing nut 40N. The bearing unit 47A and the bearing unit 47B are configured as a pair, and the bearing unit 47A serves to eliminate backlash with respect to the straight groove 1A and the cam groove 2A, and the bearing unit 47B serves to hold the fourth unit 40. The biasing metal plate 48 is a member having a substantially annular shape, and a plurality of bearing units 47A are fixed along the annular shape of the biasing metal plate 48. In the embodiment, three bearing units 47A are fixed to the biasing metal plate 48, and the bearing units 47B forming a pair are fixed to the rear base 45.

The bearing unit 47A and the bearing unit 47B respectively fixed to the biasing metal plate 48 and the rear base 45 are urged against the straight groove 1A and the cam groove 2A without backlash by spring urging using a plurality of tension coil springs 49 (urging members) described later. In addition, the bearing unit 47A and the bearing unit 47B are biased, thereby contributing to the maintenance of optical performances. In the embodiment, the straight groove 1A is adopted, but a configuration of a straight guide by a guide shaft may be adopted. The straight groove 1A is a straight groove for guiding the biasing metal plate 48 and the rear base 45 in the optical axis direction, and is formed along the optical axis direction. The cam groove 2A is an oblique groove that displaces the biasing metal plate 48 and the rear base 45 in the optical axis direction along the cam groove 2A, and is formed to be inclined with respect to the optical axis direction.

Figure 5:
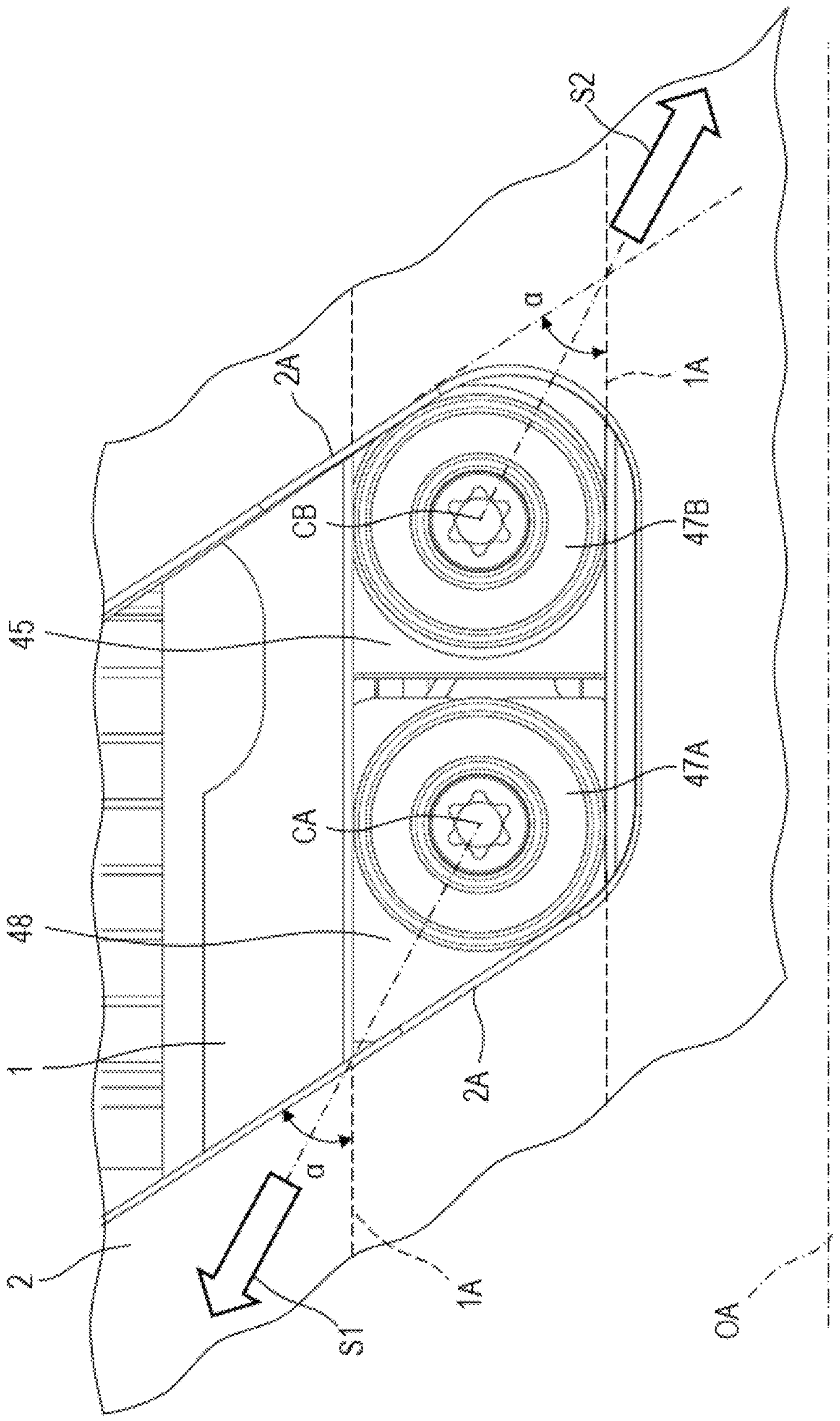
FIG. 5 is a partially enlarged view illustrating a state in which the paired bearing units are engaged with a straight groove (1A) and a cam groove (2A).
Figure 6:
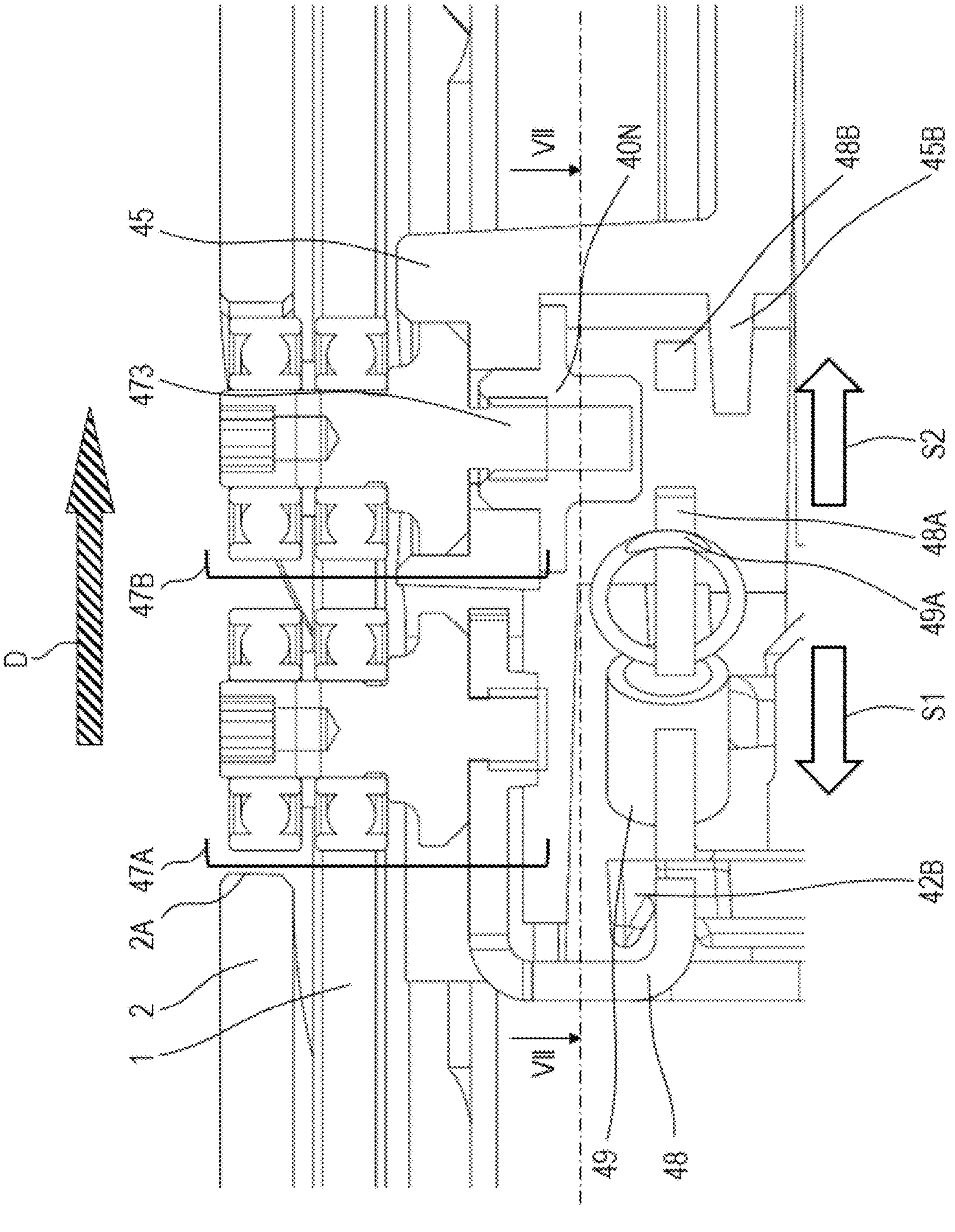
FIG. 6 is an enlarged cross-sectional view illustrating a region A surrounded by a broken line in FIG. 1.
Figure 7:
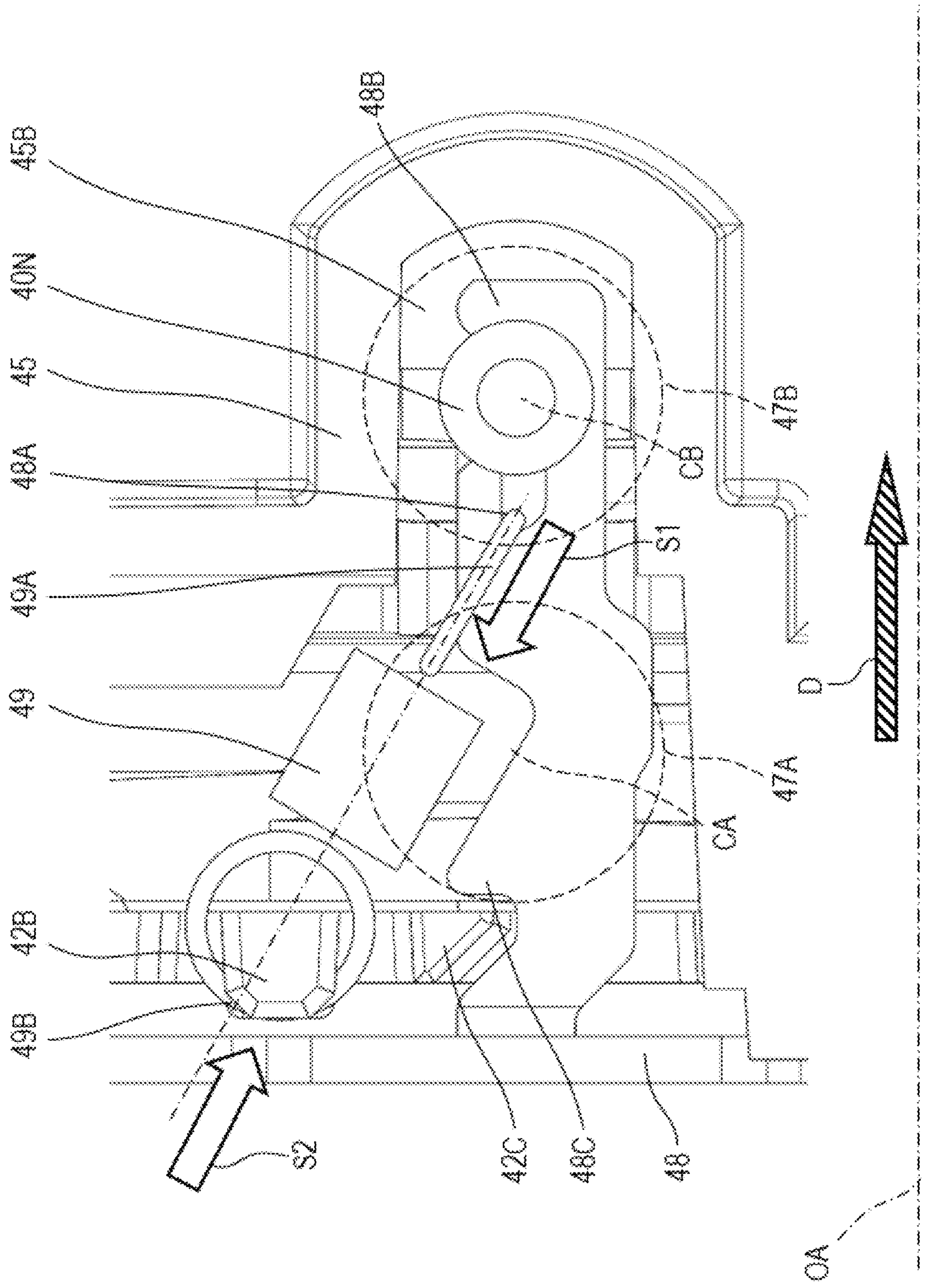
FIG. 7 is an enlarged cross-sectional view of the section taken along the section line VII-VII in FIG. 6.

Next, with reference to FIGS. 5 to 7, a biasing mechanism of a pair of bearing units respectively fixed to the rear base 45 and the biasing metal plate 48 according to the present disclosure will be described. FIG. 5 is a partially enlarged view illustrating a state in which the bearing unit 47A and the bearing unit 47B of the fourth unit 40 are engaged with the straight groove 1A of the guide barrel 1 and the cam groove 2A of the cam barrel 2, respectively. FIG. 6 is an enlarged cross-sectional view illustrating a region A surrounded by a broken line in FIG. 1. FIG. 7 is an enlarged cross-sectional view of the section taken along the section line VII-VII in FIG. 6, in which the bearing unit 47A and the position of the bearing unit 47B are indicated by broken lines.

The bearing unit 47A and the bearing unit 47B respectively fixed to the biasing metal plate 48 and the rear base 45 are arranged in the order of the bearing unit 47A and the bearing unit 47B along the optical axis direction. In addition, the bearing unit 47A and the bearing unit 47B at least partially overlap each other when viewed along the optical axis direction. Further, the cam groove 2A of the cam barrel 2 which engages with these paired bearing units and displaces the bearing units in the optical axis direction is one identical groove. With this configuration, the space in the optical axis direction can be reduced. For example, in a case where the cam groove 2A to be engaged with each of the pair of bearing units is provided, it is necessary to provide a configuration having a certain degree of thickness between the two cam grooves 2A, and there is a concern that the entire length of the cam barrel 2 is increased by that amount. However, in the embodiment, since the cam groove 2A is formed as one identical groove, the entire length can be shortened. Further, the straight groove 1A of the guide barrel 1 engaged with the paired bearing units is also formed as one identical groove. With this configuration, the paired bearing units can be arranged side by side in the optical axis direction by a biasing mechanism of the bearing units described later. As effects of this, space saving in the circumferential direction and reduction in processing cost of the straight groove 1A can be mentioned.

Next, the direction of a spring biasing force for biasing the paired bearing units will be described with reference to FIG. 5. The directions of the spring biasing forces acting on the bearing unit 47A and the bearing unit 47B fixed to the biasing metal plate 48 and the rear base 45 are respectively referred to as a first biasing direction S1 and a second biasing direction S2. The first biasing direction S1 is a direction passing through substantially the center of an angle α formed by the straight groove 1A and the cam groove 2A from the rotation center CA of the bearing unit 47A. Since the tension coil spring 49 biases the bearing unit 47A obliquely with respect to the optical axis OA, the bearing unit 47A is substantially uniformly biased with respect to the straight groove 1A and the cam groove 2A. The second biasing direction S2 in which the bearing unit 47B is biased is a direction opposite to the first biasing direction S1, and is a direction from a rotation center CB of the bearing unit 47B through substantially the center of the angle α formed by the straight groove 1A and the cam groove 2A. Since the tension coil spring 49 biases the bearing unit 47B obliquely with respect to the optical axis OA, the bearing unit 47B is substantially uniformly biased with respect to the straight groove 1A and the cam groove 2A. That is, the tension coil spring 49 biases the biasing metal plate 48 and the rear base 45 obliquely with respect to the straight groove 1A and the cam groove 2A. In the embodiment, the angle α is an acute angle. In order to realize the biasing in such a direction, as shown in FIG. 7, a tension coil spring 49 is arranged for the paired bearing units.

The tension coil spring 49 has a first spring hook portion 49A (one) on the lens mount 8 side (image side) of the tension coil spring 49, and a second spring hook portion 49B (the other) on the object side. The tension coil springs 49 are disposed in the vicinity of the paired bearing units and at positions obtained by dividing the substantially annular biasing metal plate 48 into substantially three equal parts in the circumferential direction. The lens apparatus 100 of the embodiment includes three tension coil springs 49.

Next, the spring biasing force acting on the biasing metal plate 48 side will be described. A first spring hook portion 49A of the tension coil spring 49 is hooked on a spring hook portion 48A (first abutting portion) provided on the biasing metal plate 48, so that a spring biasing force in the first biasing direction S1 is applied to the bearing unit 47A via the biasing metal plate 48. Next, the spring biasing force acting on the rear base 45 side will be described. By hooking a second spring hook portion 49B of the tension coil spring 49 on a spring hook portion 42B (second abutting portion) provided on the 4A lens holding frame 42 (see FIG. 7), a spring biasing force is applied to the 4A lens holding frame 42 in the second biasing direction S2. That is, the first spring hook portion 49A comes into contact with the spring hook portion 48A provided on the biasing metal plate 48. Further, the second spring hook portion 49B comes into contact with the spring hook portion 42B provided on the 4A lens holding frame 42. The tension coil spring 49 biases the biasing metal plate 48 and the rear base 45. In this way, the tension coil spring 49 is hung between the biasing metal plate 48 and the 4A lens holding frame 42. In other words, the biasing metal plate 48 is not screwed to another member, but is floatingly supported by the 4A lens holding frame 42 via the tension coil spring 49. The spring biasing force in the second biasing direction S2 is transmitted to the bearing unit 47B via the 4B lens holding frame 44 screwed to the 4A lens holding frame 42, the fourth eccentric roller 46, and the rear base 45. The biasing metal plate 48 is supported by the 4A lens holding frame 42 via the tension coil spring 49, and moves in the direction along the optical axis OA integrally with the 4A lens holding frame 42.

In order to achieve the above-described biasing direction, the paired bearing unit and spring hook portion needs to be arranged as follows. In the optical axis direction, a direction from the position of the bearing unit 47A fixed to the biasing metal plate 48 toward the position of the bearing unit 47B fixed to the rear base 45 is defined as a first direction D (direction from the object side toward the image side). In this case, the direction is substantially opposite to the first direction D. Furthermore when viewed along the first direction D, the spring hook portion 42B, the bearing unit 47A (based on the rotation center CA), the spring hook portion 48A, and the bearing units 47B (based on the rotation center CB) are arranged in this order. That is, the spring hook portion 42B is arranged closer to the bearing unit 47A than the bearing unit 47B in the optical axis direction, and the spring hook portion 48A is arranged closer to the bearing unit 47B than the bearing unit 47A in the optical axis direction. With this arrangement, using the spring biasing force of the tension coil spring 49 in the retracting direction, a spring biasing force can be applied in the first biasing direction S1 and the second biasing direction S2 in a direction in which the bearing unit 47A and the bearing unit 47B are moved away from each other, respectively.

By adopting the tension coil spring 49, the spring hook portion is deformed vertically and horizontally around the base, and the generation of a frictional force can be suppressed. Since the tension coil spring 49 biases the bearing unit 47B via the optical adjustment group, the fourth eccentric roller 46, and the rear base 45, for example, when the eccentricity of the optical group is adjusted, the fourth eccentric roller 46 can be rotated with good followability. However, the biasing member is not limited to the tension coil spring 49, and may be a biasing member or a biasing unit capable of suppressing the generation of the frictional force.

Next, the arrangement of the spring biasing mechanism will be described. The tension coil spring 49, the spring hook portion 48A, and the spring hook portion 42B, which are a part of the spring biasing mechanism of the embodiment, are disposed in the inner diameter side of the bearing unit 47A or the bearing unit 47B. Since the bearing unit 47A and the bearing unit 47B are disposed on the outermost radial side of the fourth unit 40 so as to be engaged with the straight groove 1A and the cam groove 2A, therefore the space on the inner diameter side can be effectively utilized, and it can contribute to the miniaturization of products. In embodiment, a part of the tension coil spring 49 and a part of the spring hook portion 48A are disposed so as to overlap the bearing unit 47A or the bearing unit 47B in the optical axis direction as illustrated in FIG. 7. Further, as shown in FIG. 6, in the cross section including the optical axis OA, the tension coil spring 49 and the spring hook portion 48A are disposed so as to at least partially overlap the bearing unit 47A or the bearing unit 47B in the radial direction (diametrical direction). The bearing unit 47A is disposed closer to the object side than the bearing unit 47B in the optical axis direction of the 4A lens 41. In addition, the spring hook portion 42B provided in the 4A lens holding frame 42 is disposed closer to the object side than the bearing unit 47A in the optical axis direction.

Next, a description will be given of a shape required for incorporating the spring biasing mechanism. As shown in FIG. 7, the 4A lens holding frame 42 is provided with a retaining portion 42C, and the biasing metal plate 48 is provided with a spring retaining portion 48C. Even if spring biasing forces are applied to the 4B lens holding frame 44 and the biasing metal plate 48 in the second biasing direction S2 and the first biasing direction S1, respectively, the 4B lens holding frame 44 and the biasing metal plate 48 are held in contact with each other by these retaining portions. Therefore, the spring biasing mechanism can be assembled without the second spring hook portion 49B and the first spring hook portion 49A of the tension coil spring 49 falling off from the spring hook portion 42B and the spring hook portion 48A, respectively. The retaining portion has a shape for assembly, and when the fourth unit 40 is engaged with the straight groove 1A and the cam groove 2A via the pair of bearing units, there is a clearance between the retaining portion 42C and the spring retaining portion 48C.

Further, as shown in FIG. 6, the nut retaining portion 45B is provided on the rear base 45, and the nut retaining portion 48B is provided on the biasing metal plate 48. When the bearing nut 40N is screwed to the bearing unit 47B, even if the bearing nut 40N is displaced toward the inside diameter side of the rear base 45, a bearing nut 40N can be screwed to the bearing nut 40N without being detached from the rear base 45 because the bearing nut 40N abuts against the retaining portions. Although the bearing nut 40N is press-fitted and held with respect to the rear base 45, there is a concern that that it may come off from the press-fit holding portion when the shaft 473 of the bearing unit 47B is pushed in by a bit of a driver. Therefore, since the above-described retaining portion is formed, ease of assembly is improved. When the bearing nut 40N is assembled into the rear base 45, there is a space because the biasing metal plate 48 is not provided, and the assembling property is good.

With the above-described configuration, the backlash between the paired bearing units can be eliminated by using the spring biasing force of the tension coil spring 49, and the paired bearing units can be arranged side by side along the optical axis direction.

In addition, the spring biasing force can be biased in the desired direction without using component forces, thereby suppressing the increase in size of the biasing member, and there is no need to increase the spring force due to loss due to component forces. The amount of deformation of the 4A lens holding frame 42 due to the spring biasing force can also be suppressed. Further, the cam grooves 2A of the cam barrel 2 with which the paired bearing units are engaged can be integrated into one, which contributes to shortening of the total length. According to the embodiment, it is possible to provide an optical apparatus which is advantageous in terms of miniaturization of a product.

Further, the spring biasing force of the tension coil spring 49 can bias not only the paired bearing units but also the 4B lens holding frame 44 as the optical adjustment group, which contributes to a reduction in the number of parts. Although the preferred embodiments of the present disclosure have been described above, the present disclosure is not limited to these embodiments, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-014353, filed Feb. 2, 2023, which is hereby incorporated by reference herein in its entirety.

What is claimed is:

1. An optical apparatus comprising:

a first holding member configured to hold a first engaging member;

a second holding member configured to hold a second engaging member;

a guide barrel having a straight guide portion with which the first engaging member and the second engaging member are engaged;

a cam barrel having a cam groove with which the first engaging member and the second engaging member are engaged; and a biasing member configured to bias the first holding member and the second holding member by one side of the biasing member abutting on a first abutting portion provided on the first holding member and the other side of the biasing member abutting on a second abutting portion provided on the second holding member, wherein the first engaging member and the second engaging member are disposed along an optical axis direction; and wherein the second abutting portion is disposed closer to the first engaging member than the second engaging member in the optical axis direction, and the first abutting portion is disposed closer to the second engaging member than the first engaging member in the optical axis direction.

2. The optical apparatus according to claim 1, wherein, as viewed along the optical axis direction, the first engaging member and the second engaging member at least partially overlap each other; and wherein the cam groove is a same groove, the cam grove allowing the first engaging member and the second engaging member to be displaced in the optical axis direction.

3. The optical apparatus according to claim 1, wherein a part of the biasing member overlaps with a part of the first engaging member or the second engaging member in the optical axis direction.

4. The optical apparatus according to claim 1, wherein at least a part of the biasing member overlaps with the first engaging member or the second engaging member in a radial direction.

5. The optical apparatus according to claim 1, wherein the second holding member holds a lens barrel that holds an optical element via a roller member so as to be capable of eccentricity adjustment, and wherein the second abutting portion is provided on the lens barrel.

6. The optical apparatus according to claim 5, wherein the first holding member is supported by the lens barrel via the biasing member, and moves in the direction along the optical axis integrally with the lens barrel.

7. The optical apparatus according to claim 1, wherein the first holding member has an annular shape, and a plurality of the first engaging members is fixed along the annular shape.

8. The optical apparatus according to claim 1, wherein the biasing member biases the first holding member and the second holding member obliquely with respect to the straight guide portion and the cam groove.

9. The optical apparatus according to claim 1, wherein the biasing member is a tension coil spring.

10. The optical apparatus according to claim 1, wherein the straight guide portion is a linear groove that guides the first holding member and the second holding member in the optical axis direction; and wherein the cam groove is formed to be inclined with respect to the optical axis direction, and the first holding member and the second holding member are displaced in the optical axis direction along the cam groove.

11. The optical apparatus according to claim 1, wherein the first engaging member performs backlash removal with respect to the straight guide portion and the cam groove.

12. An imaging apparatus comprising:

an optical apparatus and an image pickup element configured to capture an image formed by the optical apparatus, the optical apparatus comprising:

a first holding member configured to hold first engaging members;

a second holding member configured to hold second engaging members;

a guide barrel having a straight guide portion with which the first engaging member and the second engaging member are engaged;

a cam barrel having a cam groove with which the first engaging member and the second engaging member are engaged; and a biasing member configured to bias the first holding member and the second holding member by one side of the biasing member abutting on a first abutting portion provided on the first holding member and the other side of the biasing member abutting on a second abutting portion provided on the second holding member, wherein the first engaging member and the second engaging member are disposed along an optical axis direction; and wherein the second abutting portion is disposed closer to the first engaging member than the second engaging member in the optical axis direction, and the first abutting portion is disposed closer to the second engaging member than the first engaging member in the optical axis direction.

13. The imaging apparatus according to claim 12, wherein the optical apparatus is detachable from the imaging apparatus.

* * * * *